United States Patent [19]

Speronello

[11] Patent Number: 4,965,233
[45] Date of Patent: Oct. 23, 1990

[54] NOVEL ZEOLITE FLUID CRACKING CATALYSTS AND PREPARATION THEREOF FROM MIXTURES OF CALCINED CLAY

[75] Inventor: Barry K. Speronello, River Edge, N.J.

[73] Assignee: Engelhard Corporation, Edison, N.J.

[21] Appl. No.: 260,433

[22] Filed: Oct. 20, 1988

[51] Int. Cl.$^5$ .................. B01J 29/08; B01J 21/16; C01B 33/34
[52] U.S. Cl. .................................. 502/65; 502/68; 423/328
[58] Field of Search ............... 502/68, 79, 65; 423/328

[56] References Cited

U.S. PATENT DOCUMENTS

| 3,451,948 | 6/1969 | Scott | 502/68 |
| 3,515,682 | 6/1970 | Flank et al. | 502/68 |
| 4,235,753 | 11/1980 | Brown et al. | 502/68 |
| 4,493,902 | 1/1985 | Brown et al. | 502/68 |
| 4,603,040 | 7/1986 | Kuznicki et al. | 423/328 |
| 4,628,042 | 12/1986 | Speronello et al. | 502/263 |
| 4,818,508 | 4/1989 | Flank et al. | 423/328 |

FOREIGN PATENT DOCUMENTS

| 0117545 | 2/1984 | European Pat. Off. | |
| 0308989 | 2/1984 | European Pat. Off. | |
| 142953 | 5/1985 | European Pat. Off. | 502/68 |

OTHER PUBLICATIONS

CSIR Report CENG 210—"Microspheres Containing Kaolinite NaY Zeolite Synthesized in South Africa".
CSIR Report CENG 262 "Control of the Concentration NaY Zeolite Synthesized in Fired Kaolinite Microspheres".
Product Data Sheet From Supplier of Serina Kaolin.

Primary Examiner—Carl F. Dees

[57] ABSTRACT

A novel improved process for maunfacturing fluid cracking cataylsts by an in situ procedure. Sodium zeolite Y (synthetic faujasite) is crystallized in pores of a physical mixture of preformed, highly porous precursor microspheres, one portion of the microspheres is composed of metakaolin and the other portion of the mixture of microspheres being composed of kaolin calcined to undergo the exotherm (the latter sometimes being referred to as spinel calcined clay or simply spinel). In particular, by the present invention the precursor microspheres have enhanced porosity (e.g., 0.3 to 0.5 cc/g as measured by mercury porosimetry) and are obtained by spray drying a slurry of hydrous (raw) kaolin clay which is characterized by presence of a major amount of large (plus 2 micron) kaolin stacks, which when spray dried, result in microspheres having the desired high content of macropores in which zeolite Y can grow. Relatively high levels of metakaolin containing microspheres are used in the synthesis.

21 Claims, No Drawings

NOVEL ZEOLITE FLUID CRACKING CATALYSTS AND PREPARATION THEREOF FROM MIXTURES OF CALCINED CLAY

RELATED APPLICATIONS

This application is related to commonly assigned copending application Ser. No. 146,013, filed Jan. 20, 1988, (now abandoned).

BACKGROUND OF THE INVENTION

The present invention relates to improvements in fluid cracking catalysts (FCC catalysts) containing a component obtained by synthesizing high contents of zeolite Y in situ within macropores of preformed silica-alumina microspheres composed of two different types of calcined reactive kaolin clay, and preferably blending the high zeolite content microspheres with functional additives, such as activity adjusting microspheres, as described in U.S. Pat. No. 4,493,902. One of the calcined clays is metakaolin. The other calcined clay is obtained by calcining kaolin clay through its characteristic exotherm (which typically occurs at about 1830° F.). The microspheres are reacted with an alkaline sodium silicate solution that provides sodium and some of the silica utilized in the synthesis. In particular, the invention provides an economically attractive means for manufacturing the high zeolite content microspherical product, and utilizes coarse particle size ra (hydrated) kaolin to make microspheres of enhanced porosity. After spray drying, a portion of the spray dried microspheres is calcined to convert the clay to metakaolin and another portion of the same or similar microspheres of enhanced porosity is calcined under more severe conditions to cause clay in the microspheres to pass through the exotherm. A physical mixture of the two types of porous microspheres is employed in the synthesis of zeolite Y.

The following are illustrative of patents that disclose the use of kaolin calcined through the exotherm, alone or preferably in combination with metakaolin, in zeolite Y synthesis, including in situ zeolite Y synthesis by reaction of microspheres or other preformed particles composed of calcined clay. In some of the patents, the two different forms of calcined clay are in the same microspheres. In others the two forms of calcined clay are present in different particles as a physical mixture. Generally, these processes, which utilize sodium hydroxide as the sole source of sodium, feature a relatively low temperature aging step followed by a high temperature crystallization step, resulting in relatively low levels, e.g., 20-30%, of sodium zeolite Y. In some of the patents FCC catalysts are produced by providing the kaolin calcined to undergo the exotherm in the form of spray dried microspheres and utilizing metakaolin either in the form of separate microspheres or in the form of powder.

U.S. Pat. No. 3,367,886
U.S. Pat. No. 3,367,887
U.S. Pat. No. 3,506,594
U.S. Pat. No. 3,647,718
U.S. Pat. No. 3,657,154
U.S. Pat. No. 3,663,165
U.S. Pat. No. 3,932,268

U.S. Pat. No. 4,235,753 discloses a process for crystallizing zeolite Y in microspheres composed of metakaolin and separate microspheres composed of kaolin calcined through the exotherm by hydrothermal reaction with sodium hydroxide solution in the presence of seeds. Illustrative examples indicate that the crystallized products contained a maximum of 30% zeolite although the patent mentions crystallized products containing 2 to 75%, and most preferably 10-50% zeolite.

U.K. Nos. 1,271,450 and 1,342,977 (e.g., EXAMPLES 2 and 4 of the latter) illustrate the preparation of cracking catalyst particles containing synthetic faujasite (zeolite X or Y) by spray drying an aqueous slurry of raw (uncalcined) kaolin, calcining the spray dried particles at 1300° F. (or at 1000° F. and then at 1300° F.) to convert the kaolin in the microspheres to metakaolin, mixing the particles with a sodium silicate-sodium hydroxide solution, adding sodium aluminosilicate seeds and refluxing to crystallize the zeolite. Similarly, U.S. Pat. No. 3,377,006 teaches the preparation of high purity zeolite Y by reaction of finely divided metakaolin with sodium silicate in the presence of seeds. Kaolin calcined through the exotherm is not utilized in practice of these processes. Kaolin calcined to undergo the exotherm is a desirable source of reactive silica in the synthesis of Y faujasite because it results in a unique crystallization residue of calcined clay that somehow contributes significantly to the thermal stability and metals tolerance of the zeolitic component. Thus, my experience is that catalysts prepared by reacting microspheres containing only the metakaolin form of calcined kaolin clay with a seeded sodium silicate solution have not resulted in thermally stable, metals tolerant catalysts.

U.S. Pat. No. 4,493,902, the teaching of which are incorporated herein by cross-reference, discloses novel fluid cracking catalysts comprising attrition-resistant, high zeolite content, catalytically active microspheres containing more than about 40%, preferably 50-70% by weight Y faujasite, and methods for making such catalysts by crystallizing more than about 40% sodium Y zeolite in porous microspheres composed of a mixture of two different forms of chemically reactive calcined clay, namely, metakaolin and kaolin clay calcined to undergo the characteristic kaolin exothermic reaction, sometimes referred to as the spinel form of calcined kaolin.

In practice of the '902 technology, the porous microspheres in which the zeolite is crystallized are preferably prepared by forming an aqueous slurry of powdered raw (hydrated) kaolin clay ($Al_2O_3:2SiO_2:2H_2O$) and powdered calcined kaolin clay that has undergone the exotherm together with a minor amount of sodium silicate which acts as fluidizing agent for the slurry that is charged to a spray dryer to form microspheres and then functions to provide physical integrity to the components of the spray dried microspheres. See example 1. The hydrous clay, exemplified by ASP® 600 kaolin has a particle size distribution such that about 80% by weight is finer than 2 microns as determined by aqueous sedimentation. The spray dried microspheres, each containing a mixture of hydrated kaolin clay and kaolin calcined to undergo the exotherm, are then calcined under controlled conditions, less severe than those required to cause kaolin to undergo the exotherm, in order to dehydrate the hydrated kaolin clay portion of the microspheres and to effect its conversion into metakaolin, thus resulting in microspheres containing the desired mixture of metakaolin, kaolin calcined to undergo the exotherm and sodium silicate binder. The '902 patent teaches (col. 8) that the proportions of hydrated and precalcined clay used to form the microspheres are such that the calcined microspheres comprise about 30–60% by weight metakaolin and about 40–70% by weight kaolin characterized through its characteristic exotherm. In illustrative examples of the preferred embodiment of the '902 patent, about equal weights of hydrated clay and spinel are present in the spray dryer feed, whereby the resulting microspheres after calcination contain somewhat more clay that has undergone the exotherm than metakaolin because of the loss of weight of the hydrated kaolin precursor during its conversion to metakaolin.

Another method described in the '902 patent at column 6, involves spray drying a slurry containing a mixture of kaolin clay previously calcined to metakaolin condition and kaolin calcined to undergo the exotherm but without including any hydrated kaolin in the slurry, thus providing microspheres containing both metakaolin and kaolin calcined to undergo the exotherm directly, without calcining to convert hydrated kaolin to metakaolin. However, the patent teaches that less attrition resistant zeolitized microspheres are produced by this approach. Still another method described in Example 6 involves spray drying a 60% solids deflocculated slurry hydrated kaolin clay believed to be HT kaolin as described in Example 1 of U.S. Pat. No. 3,663,165 to form microspheres part of which are calcined under conditions to convert them into metakaolin and another part of which are calcined to undergo the exotherm. As described in the cross-referenced '165 patent HT clay is "a fine size fraction of hydrated Georgia kaolin clay, corresponding to a No. 2 paper coating grade." Thus, HT clay is similar to ASP ® 600 clay which has the same particle size distribution, corresponding to that of No. 2 paper coating grade. A relatively low level of zeolite Y (44%) was reported in Example 5 and the crystallization of 50% or more zeolite Y achieved by the preferred technique of using a mixed hydrous/calcined clay spray dryer feed was not achieved.

In carrying out the various embodiments of the invention described in the '902 patent, the microspheres composed of kaolin calcined to undergo the exotherm and metakaolin or the physical mixtures of microspheres are reacted with a caustic enriched sodium silicate solution in the presence of a crystallization initiator (seeds) to convert silica and alumina in the microspheres into synthetic sodium faujasite (zeolite Y). The microspheres are separated from the sodium silicate mother liquor, ion-exchanged with rare earth, ammonium ions or both to form rare earth or various known stabilized forms of catalysts. The technology of the '902 patent, especially the preferred embodiments, provides means for achieving a desirable and unique combination of high zeolite content associated with high activity, good selectivity and thermal stability, as well as hardness (attrition-resistance). By appropriate ion-exchange treatment, desirable cracking selectivity is achievable.

EPA No. 0,194,101, published Sept. 10, 1986 which claims priority from U.S. Ser. Nos. 707,635 707,362, and 750,813, all now abandoned, describes variations of the ion-exchange treatment applied to the sodium form high zeolite content microspheres of the '902 patent to provide so-called "octane" catalysts, the zeolite component of which is characterized by having a low sodium content, reduced unit cell size and the absence of rare earth or the permissible presence of minimal amounts of rare earth. These known variations of zeolite Y faujasite are frequently referred to as stabilized and/or ultrastabilized zeolite Y. Hereinafter the various stabilized forms of zeolite Y, e.g., calcined H-Y, Re-Y, will be called ultrastabilized Y which now has a broader meaning than the original term which was limited to zeolite Y having unit cell size below 24.45 Angstrom units.

Technology described in the '902 patent has met widespread commercial success. Because of the availability of high zeolite content microspheres which are also attrition-resistant, custom designed blended catalysts are now available to oil refineries with specific performance goals, such as improved activity and/or selectivity without incurring costly mechanical redesigns. A significant portion of the FCC catalysts presently supplied to domestic and foreign oil refiners is based on the technology.

As mentioned, the preferred technique for making microspheres used in practice of the '902 technology utilizes the composite microsphere approach (microspheres containing both metakaolin and kaolin calcined to undergo the exotherm), substantially as described in the '902 patent, e.g., Example 1, in which microspheres are prepared by spray drying a slurry of mixture of clay previously calcined to undergo the exotherm, e.g., SATINTONE ® calcined clay, and about an equal weight of hydrated fine particle size kaolin, e.g., ASP ® 600 clay. The resulting spray dried microspheres are calcined to convert the hydrated kaolin component of the microspheres to metakaolin and are then employed as the host for zeolite synthesis. One drawback to the preferred process, from the production point of view, is that about half the clay, e.g., SATINTONE ® clay, is calcined twice. Calcination is an energy consuming process. Another drawback is that the hydrated kaolin, e.g., ASP ® 600 clay, is a high quality, relatively expensive form of kaolin, prepared by removing a substantial amount of large (plus 2 microns) clay particles from a crude clay and resulting in a lower value coarse particle size kaolin by-product stream.

In view of the commercial importance of FCC catalyst blends based on high zeolite content microspheres derived from kaolin clay there has been a continuing search for means to produce high zeolite content microspheres more economically, without sacrifice in attrition-resistance, activity, selectivity, thermal stability and metals tolerance. This present invention is a result of these searches.

SUMMARY OF THE INVENTION

This invention relates to novel FCC catalysts (hereinafter PMMS) catalysts and to their manufacture by a novel improved process (hereinafter PMMS process). The term "PMMS" is an acronym for porous mixed microsphere synthesis.

In one presently preferred embodiment of the invention, two types of microspheres of enhanced porosity (PMS) are made by spray drying one or more slurries of coarse particle size hydrous kaolin into microspheres, and then calcining one portion of the microspheres (PMS-2) to metakaolin. Another portion of the same (or different) microspheres obtained by spray drying coarse particle size hydrous kaolin is calcined through the exotherm to the spinel phase, preferably without substantial mullite formation (PMS-1). The PMS-1 and PMS-2 preferably both have a porosity in the 600 to 20,000 Angstrom range of from about 0.3 to 0.5 cc/g as determined by Hg porosimetry, although the PMS-2 may have a porosity as low as about 0.2 cc/g. (The Hg porosity of the calcined microspheres of Example 5 of the '902 patent, prior to crystallization, is only about 0.2 cc/g). The microspheres having enhanced porosity are mixed and then crystallized by hydrothermal reaction with an alkaline sodium silicate solution in a weight ratio of between about 80/20 PMS-1/PMS-2 to 20/80 PMS-1/PMS-2, preferably in the range of 55/45 PMS-1/PMS-2 to 65/35 PMS-1/PMS-2. Above a ratio of ca. 80/20 PMS-1/PMS-2 there will not be sufficient alumina to grow sufficient zeolite, e.g., above 50%, and below a ratio of about 20/80 PMS-1/PMS-2, zeolite stability is expected to be inferior.

In another embodiment of the invention, different types and amounts of hydrous clays in the PMS-1 and PMS-2 precursor microspheres are used to achieve desired properties. For example, higher temperature calcination for the PMS-1 phase may require greater porosity in the spray dried microsphere to achieve the same calcined pore volume as the PMS-2. Therefore, the PMS-1 can be made using coarser hydrous clay than the PMS-2 to achieve the greater spray dried porosity.

In still another embodiment, some calcined clay, preferably by-product calcined clay is included in the slurry of coarse hydrated clay that is spray dried. For example, adding kaolin that has been calcined through the exotherm to the slurry of hydrated kaolin that is spray dried to form microspheres and then calcining a portion of the microspheres to PMS-1 temperatures and a portion of the microspheres to PMS2 temperatures would yield one microsphere type comprising all spinel calcined kaolin and another microsphere type comprising both spinel phase kaolin and metakaolin.

It was surprising and unexpected to the present inventor to find that thermally stable and metals tolerance zeolitic catalysts could be made from a physical mixture of two (or more) different microspheres, one of which is rich in metakaolin, and that the catalyst will apparently have the same properties as if the constituents of the various microsphere types were present in the same microsphere. The present inventor has had extensive experience in attempts to make high zeolite content FCC catalyst by crystallization zeolite Y from calcined kaolin clay, all in metakaolin condition. Those catalysts had poor hydrothermal stability and metals tolerance. It was then found that adding spinel phase kaolin to the metakaolin in the precursor microspheres, as described in the '902 patent, improved the stability of the catalyst and improved metals tolerance. It was believed that the spinel phase kaolin provided a stabilizing "skeleton" for zeolite to grow on, and that this spinel matrix caused the improved stability and metals tolerance. Contrary to past experience based on using spinel and metakaolin as the basis for the in situ synthesis of cracking catalysts, in the case of PMMS catalysts a substantial amount of the zeolite can be crystallized in a physical mixture of microspheres of which a substantial proportion of the calcined clay is the form of metakaolin, yet the PMMS catalyst has acceptable stability and metals tolerance. It would have been expected that the performance would be intermediate between the good performance of commercial cracking catalysts based on the '902 technology and the inferior performance of the early metakaolin based high zeolite content catalyst. Unexpectedly, catalysts of the invention are as good as the commercial catalyst. An explanation for this phenomenon is not presently known.

After zeolite crystallization, the PMMS Na+ form catalyst can be processed into a finished FCC catalyst using any of the techniques well known in the art. The crystallized microspheres may be washed to remove entrained silicate mother liquor, or silica retained to reduce matrix surface area and microporosity. The crystallized microsphere should be ion exchanged to reduce sodium content, preferably with ammonium ions, rare earth ions, or a mixture of ammonium and rare earth ions. The unit cell size of the zeolite may be reduced, e.g., by calcination of the ammonium exchanged form in a steam containing atmosphere to provide ultrastabilized zeolitic catalysts. Finally, combinations of the above treatments any also be applied (e.g., low levels of rare earth ion exchange followed by calcination) to convert the Na+ form catalyst precursor to finished FCC catalyst.

The presently preferred embodiments are to wash the catalyst after crystallization to remove entrained silicate mother liquor, and then to either: 1) rare earth ion exchange to ca. 8% by weight rare earth oxides, calcine to about 800° F., and ammonium ion exchange to reduce sodium content to ca. 0.4%, or 2) ammonium ion exchange to reduce the sodium content to about 3%, calcine at ca. 1100° F., in a steam containing atmosphere to reduce the zeolite unit cell size to about 24.60 A., and finally to ammonium ion exchange to reduce sodium content to about 0.4%.

The high activity zeolitic microspheres of the invention are adapted to be blended with lower activity functional additives such as microspheres composed of calcined kaolin clay and/or microspheres containing a vanadium immobilizing agent, a preferred form of the latter being the magnesia-enriched calcined kaolin clay microspheres described in EPA No. 06/937,457, the teachings of which are incorporated herein by cross reference. In some cases blends may include other catalytic microspheres which function to adjust activity, selectivity or both. See also the '902 patent.

As mentioned above, commercial FCC catalysts are currently made from precursor microspheres comprising a mixture of kaolin that has been calcined through its exotherm and metakaolin. This type microsphere (MSS) is made by first calcining powdered clay through its exotherm, reslurrying the calcined clay in an aqueous slurry of fine particle size hydrous clay and sodium disilicate (binder) solution, spray drying, and recalcining to convert the hydrous clay component to metakaolin. The current commercial process is expensive because it requires that the calcined clay portion of the microspheres be calcined twice. This invention avoids the need to double calcine any portion of the precursor microspheres and it also substitutes relatively less valuable coarse hydrous clay for the more expensive fine hydrous clay used in the current process.

The method of the invention, especially in the preferred embodiments using coarse hydrated kaolin clay without any added calcined kaolin in the slurry that is spray dried to form microspheres which are then calcined, is of significant commercial importance because it provides means for appreciably reducing the costs involved in making stable metals tolerant attrition-resistant high zeolite content cracking catalysts from microspheres of calcined clay.

DESCRIPTION OF PREFERRED EMBODIMENT

The coarse particle size hydrated kaolin clay used in practice of this invention is available as a by-product in the wet processing of soft kaolin clay crudes such as those of Central Georgia to separate clay particles on the basis of differences in particle size and to recover one or more fine size clay fractions useful in producing premium coating clay grades of kaolin such as those known as No. 1 and No. 2 coating grades. In other words, coarse clay used in practice of this invention would be a by-product from the manufacture of ASP ® 600 kaolin or HT ™ kaolin. Generally, kaolin particles larger than 2 microns (which are concentrated in the by-product) are composed of stacks identifiable by electron micrograph and particles finer than 2 microns (which are concentrated in the coating grade fractions) are composed of individual thin platelets. The coarse particle size kaolin clay I employ contains a major weight percent of stacks of individual kaolin clay platelets, with a minor weight percent of individual clay platelets. The prior art has used kaolins (e.g., HT clay or ASP 600 clay) composed of a majority of particles composed of individual platelets.

Soft Georgia kaolin crudes, after removal of grit (e.g., particles larger than 325 mesh) and undispersed agglomerates are polydispersed and typically have an average particle size of about 1.5 microns (e.s.d., equivalent spherical diameter) determined by sedimentation from water using a SEDIGRAPH ® 5000 particle size analyzer. In other words, about 50% by weight of the degritted crude clay, prior to fractionation, is composed of clay particles having diameters larger than 1.5 microns as determined by sedimentation and 50% by weight is finer than 1.5 microns. The weight of particles which are finer than 2 microns in a degritted crude clay of this type is typically about 55 to 70%.

The degritted crude clays are conventionally wet classified by settling or in centrifuges to recover one or more finer fractions enriched in the content of particles 2 microns or finer. For example, soft degritted Georgia kaolin crudes are conventionally charged to centrifuges to recover No. 1 and No. 2 coating clay fractions as centrifuge overflow products. No. 1 and No. 2 coating clays contain, respectively, at least 90% by weight and 80% by weight of particles finer than 2 microns. The centrifuge residue is a concentrate of particles larger than 2 microns which has lower commercial value. Examples of the coarse kaolins are the materials, such as NOKARB ™ or ASP ® 400 fillers, which typically have an average particle size in the range of 4 to 6 microns, e.g., 4.5 to 5.7 microns, and contain only about 16 to 33% by weight of particles finer than 2 microns. ASP ® 400 hydrated kaolin clay is described in Engelhard Technical Bulletin No. TI-1004, entitled "Aluminum Silicate Pigments" (EC-1667). The present invention makes use of this or similar coarse by-product clay and results in more porous calcined clay microspheres than can be achieved using the premium value No. 1 and No. 2 coating clay fractions. The coarse clay fraction used in practice of this invention could be an unfractioned crude, provided that the particle size distribution was sufficiently coarse to yield a pore volume of at least 0.3 cc/g after spray drying and calcination. It is within the scope of the invention to use the coarse size fraction of an ultrafine crude, e.g., a degritted crude that is 80% to 90% by weight finer than 2 microns although such crudes will have a lower content of coarse particles.

In a preferred embodiment of the invention, an aqueous slurry of the coarse particle size hydrated kaolin is prepared by mixing powdered clay, water and one or more binders of which sodium silicate is presently preferred. Sufficient binder is necessary to impart strength to the porous microspheres so that they do not attrit to an unacceptable degree prior to zeolite crystallization. In addition, there is evidence that at the relatively high levels of sodium silicate use needed for binding, the slurry is in an over-deflocculated condition and pore volume is increased. Typical binder levels are in the range of about 1 to 10% silica (from sodium silicate solution) relative to the as-is weight of clay in the slurry.

The aqueous slurry is then spray dried to obtain microspheres comprising a bonded mixture of hydrated clay. The microspheres have average particle diameters that are typical of commercial fluid catalytic cracking catalysts, e.g., 65-70 microns. Suitable spray drying conditions are generally set forth in the '902 patent.

In practice of this invention, the solids content of the slurried feed to the spray dryer is generally in the range of about 40% to 50%, typically about 47%, and is generally lower than that used in the prior art. Since the slurry is formulated with coarse clay, these slurries are more viscous and result in the formation of spray dried microspheres in which the powdered solid components are less densely packed, this being evidenced before and after calcination by desirably increased macroporosity (pores in the range of 600 to 20,000 Angstrom units as measured by Hg porosimetry).

After spray drying, one portion of the microspheres of coarse particle size kaolin is calcined at a temperature and for a time (e.g., for 2 hours in a muffle furnace at a chamber temperature of about 1350° F.) sufficient to convert the hydrated clay component of the microspheres to metakaolin. Another portion of the same microspheres of coarse particle size kaolin, or a batch of microspheres of coarse particle size kaolin from a different spray dryer feed, is calcined to produce porous microspheres of kaolin calcined through the characteristic exotherm, for example by calcining a one inch bed of the microspheres for about 1 to 2 hours in a muffle furnace at a chamber temperature of about 1800°-1900° F. The latter calcined microspheres may include small amounts of mullite (which can be detected by X-ray analysis). The preferred pore volume of the calcined microspheres (PMMS-1 and PMMS-2) is preferably in the range of 0.3 to 0.5 cc/g as by Hg porosimetry. The Hg pore volume of typical prior art calcined MSS is about 0.35-0.45 cc/g.

To carry out the crystallization step in which sodium faujasite is crystallized within pores of the calcined microspheres, the calcined clay microspheres are mixed with one or more sources of sodium silicate, sodium hydroxide and water to form a fluid slurry. Preferably, a sodium silicate diluted solution of amorphous zeolite seed ("quenched seed") is also added to the slurry. See U.S. Pat. No. 4,631,262, the teachings of which are incorporated herein by cross-reference. Preferably, the resulting slurry contains: (a) molar ratio of $Na_2O/SiO_2$ in the solution phase of about 0.45 to 0.80; and (b) a weight ratio of $SiO_2$ in the solution phase to microspheres of calcined clay of about 0.35 to 2.5. The preferred order of addition of reagents to a reactor involves initial addition of solution of seeds, followed by sodium silicate and then water. A mixture of microspheres composed of the mixture of calcined clays is preferably added last. The microspheres (PMS-1 and PMS-2) may be added separately or in any sequence. If necessary, a solution of sodium hydroxide may be included in the slurry to adjust the $Na_2O$ in the solution phase to an appropriate level. When sodium hydroxide is used, it is preferable to add this material to the reactor after addition of the seeds. For example, sodium hydroxide solution can be added immediately after addition of sodium silicate and before addition of water. As used herein, the "solution phase" of the slurry shall include all the material added to the crystallization reactor (including the solution of sodium silicate diluted zeolite seeds) except the material constituting the calcined clay microspheres.

The molar ratios of all the constituents present in the crystallization reactor at the commencement of the crystallization process typically are within the following ranges:

| $Na_2O/SiO_2$ | $SiO_2/Al_2O_3$ | $H_2O/Na_2O$ |
|---|---|---|
| 0.30 to 0.60 | 3 to 13 | 20 to 35 |

The preferred weight ratio of water to calcined clay microspheres at the beginning of the crystallization process is about 2 to 12. In order to minimize the size of the crystallization reactor, it is preferred to maximize the amount of calcined kaolin clay microspheres added to the reactor and to minimize the amount of water present during the crystallization process.

Crystallization is carried out by heating the reactants in a reactor configured for reflux operation to a temperature within the range of about 90° to 100° C. for about 10 to 30 hours until the maximum zeolite content is developed. Maximum zeolite content is ascertained by determining when negligible additional zeolite growth is observed over a one (1) hour time interval.

After the crystallization process is terminated, the microspheres containing Y-faujasite are separated from at least a substantial portion of their mother liquor, e.g., by filtration. It may be desirable to wash the microspheres by contacting them with water either during or after the filtration step. The purpose of the washing step is to remove mother liquor that would otherwise be entrained within the microspheres.

The microspheres contain crystalline Y-faujasite in the sodium form. In order to obtain a product having acceptable catalytic properties, it is necessary to replace sodium cations in the microspheres with more desirable cations. This may be accomplished by contacting the microspheres with solutions containing ammonium or rare earth cations or both. The ion exchange step or steps are preferably carried out so that the resulting catalyst contains less than about 1.5%, most preferably less than about 0.5%, by weight $Na_2O$. After ion exchange, the microspheres are dried, preferably by flash drying, to obtain the microspheres of the present invention.

The preferred catalyst of the invention comprises microspheres containing at least 40% and preferably more than 50% by weight Y-faujasite, most preferably at least 55% Y-faujasite as determined by X-ray measurements made on the ascrystallized sodium faujasite form zeolite. As used herein, the term Y-faujasite shall include synthetic faujasite zeolites exhibiting, in the sodium form, an X-ray diffraction pattern of the type described in Breck, Zeolite Molecular Sieves, p. 369, Table 4.90 (1974), and having a crystalline unit cell size, in the sodium form (after washing any crystallization mother liquor from the zeolite), of less than about 24.75A as determined by the technique described in the ASTM standard method of testing titled "Determination of the Unit Cell Size Dimension of a Faujasite Type Zeolite" (Designation D3942-80) or by an equivalent technique. The term Y-faujasite shall encompass the zeolite in its sodium form as well as in the known modified forms, including, e.g., rare earth and ammonium ion exchanged forms and stabilized forms. The percentage of Y-faujasite zeolite in the microspheres of the catalyst is determined when the zeolite is in the sodium form (after it has been washed to remove any crystallization mother liquor contained within the microspheres) by the technique described in the ASTM standard method of testing titled "Relative Zeolite Diffraction Intensities" (Designation D3906-80) or by an equivalent technique. It is important to equilibrate the microspheres carefully before X-ray evaluations are made since equilibration can have a significant effect on the results.

It is preferred that the Y-faujasite component of the microspheres, in their sodium form, have a crystalline unit cell size of less than about 24.73A and most preferably less than about 24.69A. Typically, the Y-faujasite component of the microspheres has a crystalline unit cell size of about 24.64–24.73A. We believe that a unit cell size range of between 24.64–24.73A corresponds to a $SiO_2/Al_2O_3$ molar ratio of the Y-faujasite of about 4.1–5.2.

After the zeolite has crystallized, optionally silica retained (see U.S. Pat. No. 4,490,902) and the microspheres have been recovered, the sodium content of the zeolite is reduced in one or more stages.

The production of an octane catalyst comprises sequential ammonium exchange and calcination steps to form microspheres containing reduced cell size Y-faujasite. The overall sodium content should eventually be reduced to less than about 1.5% (based on the weight of the catalyst). In the laboratory, it was found desirable to conduct 2 ammonium exchanges on the dried catalyst prior to the first calcination step. Desirably, these exchanges are achieved by slurrying the catalyst at from about 30% to about 40% by weight solids in an 80° C. ammonium nitrate solution having a concentration between about 1N and 3N and maintained at a pH in the neighborhood of 3.0 by addition of nitric acid and stirring for a period of time ranging from about 10 minutes to 60 minutes. The sodium content subsequent to the initial ammonium exchanges should be around 3%.

After this ammonium exchange treatment, the microspheres are calcined in the presence of steam. Typically, the cell size of the zeolite as measured subsequent to the initial ion exchange and calcination step should be reduced by at least about 0.10 Angstrom units. Typical calcination temperatures and times range from about 700° to about 1,200° F., preferably 900° to 1,150° F., more preferably 1,000° to 1,150° F., for from about 1 to 2 hours with provisoes that it is important not to abuse the zeolite so severely that the cage structure collapses during calcining but it is important to calcine severely enough that residual sodium can be removed subsequently without triggering collapse of the zeolitic cage structure during the subsequent ammonium exchanges. Calcining at 1,000° F. to 1,150° F. for about 2 hours seems to adequately satisfy both of these provisoes. About 15% by weight of added water seems to provide sufficient steam for the cell size reduction in closed crucible systems.

After calcining, an additional ammonium exchange step should be carried out substantially as set forth above. The sodium oxide contact after this final ion exchange should be about 0.2–0.5% by weight.

The volume of pores ranging in size from 2 to 10 nm in diameter in catalysts of this invention is, e.g., from about 0.02 to about 0.25 cc/g. In preferred embodiments of this invention, the volume of pores ranging from 2 to 10 nm (micropore volume) will be from about 0.05 to 0.20 cc/g, and the volume of pores ranging from 600 to 20,000 Angstrom units will be less than about 0.2 cc/g. In more preferred embodiments, the micropore volume will be from about 0.08 to about 0.15 cc/g, and in still more preferred embodiments, the micropore volume will be from about 0.08 to about 0.10 cc/g.

In octane catalysts of this invention, the unit cell size of the Y-faujasite will be reduced by e.g. at least 0.05 Angstrom units, preferably at least about 0.10 Angstrom units, from the initial cell size which is typically about 24.70 Angstrom units.

The sodium content of the octane catalyst of this invention is usually under 1.5% by weight based on the total weight of the catalyst including both zeolite and matrix. In preferred embodiments, the sodium content (as $Na_2O$) will be less than 0.5%.

Octane catalysts according to this invention will often be calcined only once since the final calcination is obtained when the catalyst is added to the regenerator. In that case, the cell size of the catalyst in use is predominately controlled by the final $Na_2O$ content which optimally is in the range of from 0.2 to about 1.5% by weight, more preferably in the range of from about 0.2% to about 0.5% by weight.

A modification of ASTM Standard Test Method D-4365-85 was used in illustrative examples for determining the zeolite surface area of catalysts and covers the determination of the total area of catalyst ascribable to micropores; the matrix area of the catalyst and the zeolite area of the catalyst, using P/Po values of 0.08, 0.10, 0.14, 0.17 and 0.20 for collecting the data and using this data to calculate total BET surface area and the deBoer t-plot surface area for the matrix. The modification of D-4365-85 was to not use the 0.975 correction as specified in paragraphs 11.4 and 11.14 when using the formula micropore area=BET area−t area in paragraph 11.15.

The following examples, given for illustrative purposes, demonstrate the presently preferred procedures for the preparation of octane catalysts of the invention and show some the advantages of the invention. Unless otherwise indicated, all proportions are on a dry weight basis. All particle sizes of clay in the micron size range were determined with a SEDIGRAPH 5000 analyzer.

In the illustrative examples based on laboratory preparation which follow, all zeolite crystallization reactions utilized a single batch of seed mixture prepared in the laboratory as follows:

1. A sodium aluminate solution was prepared by combining the following weights of ingredients in a beaker and stirring until the solids were dissolved:
   a. 2988.5 g of a sodium aluminate solution having a nominal composition of 6% $Al_2O_3$, 19% $Na_2O$, and the balance water.
   b. 392.1 g of NaOH pellets
   c. 1361.3 g DI (deionized) water
   The solution had a specific gravity of 1.30 g/cc
2. A sodium silicate solution was prepared by combining the following weights of ingredients in a beaker and stirring until the solids were dissolved:
   a. 6593.2 g of N ®Brand sodium silicate solution having a nominal composition of 8.7% $Na_2O$ and 29% $SiO_2$.
   b. 509.8 g of NaOH pellets
   c. 2084.9 g DI water The solution had a specific gravity of 1.35 g/cc
3. A sodium silicate quenching solution was prepared by combining the following weights of ingredients in a beaker and stirring until the solids were dissolved:
   a. 6593.2 g of N-Brand sodium silicate solution having a nominal composition of 8.7% $Na_2O$ and 29% $SiO_2$.
   b. 509.8 g of NaOH pellets
4. 583.2 g of sodium silicate solution from #2 above was added to a 4 liter beaker.
5. That solution was rapidly stirred with a two layer propeller stirrer driven by a Talboy stirring motor.
6. To that solution the following two streams of reagents were pumped at the following flow rates:
   a. Sodium aluminate solution (#1 above) 97 cc/min
   b. Sodium disilicate solution (#2 above) 160 cc/min
7. Each was continued until a total of 1048 cc of sodium aluminate solution and 1358 cc of sodium silicate solution were added.
8. The stirring was stopped, the beaker covered, and then it was transferred to a water bath at 100° F. for aging.
9. After about 36 hours of aging at 100° F., 1025 cc of the sodium silicate quench solution was added to the seed mixture. It was then transferred to a refrigerator for storage.
10. The chemical analysis of the quenched seed mixture was as follows:

12.5% $Na_2O$, 17.7% $SiO_2$, 1.04% $Al_2O_3$, 31.5% total solids

EXAMPLE 1

In this example FCC catalysts of the invention matching the physical and clean catalytic properties of octane versions of the '902 catalyst controls were made by substituting a 54/46 blend of porous MS-1 (PMS-1) and porous MS-2 (PMS-2) for MSS in the zeolite synthesis reaction. Catalytic properties were determined by a microactivity procedure (MAT) substantially as described in the '902 patent. Briefly, PMS-1 & 2 were made by spray drying by-product hydrous kaolin into microspheres using sodium silicate as a binder, and then calcining at ca. 1800° and 1350° F. respectively. Through the use of less expensive raw materials and by eliminating the double drying/calcination needed for the calcined clay portion of MSS, the porous mixed microsphere (PMMS) process will significantly reduce precursor microsphere costs.

The experimental catalyst of the invention was made from microspheres that were spray dried from a 47% solids slurry of ASP ® 400 coarse particle size hydrated kaolin in water to which a sodium disilicate (SDS) solution was added in an amount equivalent to 2 g $SiO_2$ from SDS/100 g of ASP ® 400 clay. Spray drying was done using a lab scale Bowen tower dryer having a two fluid nozzle mounted vertically upwards and using compressed air as the atomizing medium. The spray dryer inlet temperature was about 375° C., and the outlet temperature about 140° C. A one inch deep layer of the microspheres was calcined at 1350° F. for 2 hours in an uncovered 6" wide×2" long×2" deep fused silica tray in a muffle furnace and will be referenced as porous MS-2 (PMS-2). Another one inch deep layer was calcined at 1830° F. for 2 hours in a similar manner and will be referenced as porous MS-1 (PMS-1). Zeolite crystallization was performed as follows:

1. To a one liter Pyrex® resin kettle prepared for stirred, reflux operation was added the following ingredients, in order with sufficient stirring to suspend the solids:
   a. 410 g of N®Brand sodium silicate solution (9.10% $Na_2O$, 29.3% $SiO_2$)
   b. a solution of 170 g of 24.3% NaOH solution and 106 g of DI water.
   c. 68.3 g of seed mixture.
   d. 108 g of PMS-1 and 92 g of PMS-2.
2. The reaction mixture was heated to 210° F. for crystallization.
3. After zeolite growth had reached a peak of about 60% (typically in 18 to 23 hours) by X-ray diffraction vs. a nominally 100% Y-faujasite reference, the solids were filtered over Whatman 54 filter paper, washed with DI water, and dried on the bench overnight.
4. Steps 1-3 above were repeated once more, except that the weights NaOH solution and DI water were changed to 181 g and 97 g.
5. The two portions of dried, crystallized microspheres were mixed together and ammonium ion exchanged as follows to reduce the $Na_2O$ content of the microsphere to about 3%:
   a. 750 g of a solution containing 54% by weight ammonium nitrate was added to a 2 liter stainless steel beaker.
   b. To this, 250 g of DI water was added.
   c. The pH was adjusted to 3 using a 1/1 solution of $HNO_3$ in water.
   d. With stirring to suspend the solids, 500 g of catalyst precursor microspheres were slowly added to the beaker. The pH was maintained at between 2.8 and 3.5 by the continued addition of $HNO_3$ solution.
   e. After all the catalyst had been added, the pH was adjusted to 3.2 to 3.5, and the slurry heated to 180° F. for 30 minutes.
   f. After 30 minutes of exchange time, the slurry was filtered over Whatman 54 paper and washed with DI water.
   g. a-f above were repeated a second time, except for the following:
      1. the wet filtered cake was used as is,
      2. only 125 g of 54% ammonium nitrate solution was used.
      3. the total weight of water (including water entrained in the wet cake) was 875 g.
   h. The wet cake was then dried overnight on the bench.
6. The catalyst was calcined to reduced the unit cell size of the zeolite, as follows:
   a. 500 g of catalyst containing ca. 25% free moisture was placed into a fused silica tray above described.
   b. The tray was covered and placed into a muffle furnace at 700° F. for 2 hours.
   c. The catalyst was removed from the furnace and cooled to room temperature.
   d. DI water (130 g) was stirred into the catalyst to restore 25% (wt.) free moisture.
   e. The tray was again covered and inserted into a muffle furnace at 1150° F. for 2 hours to complete the calcination.
7. The catalyst was then ion exchanged until the sodium content was between about 0.38% and 0.48%. The initial exchange was done as in a. through c. below. Subsequent exchanges were done repeatedly as in d. through g. below until the sodium analysis was in the appropriate range (typically 1-3 additional exchanges):
   a. A solution of 1 g 54% ammonium nitrate solution per g of calcined catalyst and 2 g water per g of calcined catalyst was prepared and heated to 180° F.
   b. To this was added, with slow stirring to suspend the solids, the calcined catalyst.
   c. After 15 minutes, the slurry was filtered over Whatman 54 paper and washed with DI water.
   d. A solution of 1 g 54% ammonium nitrate solution per g of calcined catalyst and 2 g water per g of calcined catalyst was prepared and heated to 180° F.
   e. The pH of the solution was adjusted to 3.5 using $HNO_3$ solution.
   f. To this was added, with slow stirring to suspend the solids, the microspheres.
   g. The pH was readjusted to 3.2 to 3.5 using $HNO_3$ solution.
   h. After 15 minutes, the slurry was filtered over Whatman 54 paper and washed with DI water.

Samples of this catalyst were steam deactivated at either 1450° or 1500° F. for 4 hours using the Engelhard open system steaming procedure mentioned in the '902 patent. All were screened −100+270 (U.S.) mesh after steaming. The 1500° F. steamed samples were tested using the MAT both as-steamed, and blended 1/1 with steamed, calcined clay microspheres (CCM) that had been screened −100+270 mesh. Samples steamed at 1450° F. were only tested as blends with CCM. CCM is a low surface area, activity adjusting blending component obtained by slurrying hydrated kaolin clay such as ASP® 600 clay in water and spray drying to form microspheres which are then calcined to form a mixture of spinel and mullite.

EXAMPLE 2

A control catalyst made from commercial microspheres that were nominally a 54/46 mix of kaolin that had been calcined through its exotherm without substantial formation of mullite and metakaolin (MSS) was prepared as follows using procedures substantially as described in the '902 patent (Example 1) prior to ion exchange:
1. To a one liter Pyrex® resin kettle prepared for stirred, reflux operation was added the following ingredients, in order with sufficient stirring to suspend the solids:
   a. 390.6 g of N-Brand sodium silicate solution (9.02% $Na_2O$, 28.9% $SiO_2$).
   b. a solution of 159.3 g of 23.4% NaOH solution and 108.1 g of DI water.
   c. 68.3 g of seed mixture.
   d. 200 g of microspheres (MSS).
2. The reaction mixture was heated to 210° F. for crystallization.
3. After zeolite growth had reached a peak of about 60% (typically in 18 to 23 hours) by X-ray diffraction vs. a nominally 100% Y-faujasite reference, the solids were filtered over Whatman 54 filter paper, washed with DI water, and dried on the bench overnight.
4. Steps 1-3 above were repeated twice more, except that the weights of N®Brand sodium silicate solution and NaOH solution were changed to 385.3 g and 150.4 g to reflect new lots of those reagents having the following compositions:
   a. N-Brand: 29.3% $SiO_2$, 9.1 $Na_2O$ b. NaOH solution: 24.9% NaOH
5. The three portions of dried, crystallized microspheres were mixed together and ammonium ion exchanged as follows to reduce the Na₂O content of the microspheres to about 3%:
   a. 1125 g of a solution containing 54% by weight ammonium nitrate was added to a 2 liter stainless steel beaker.
   b. To this, 375 g of DI water was added.
   c. The pH was adjusted to 3 using a 1/1 solution of HNO₃ in water.
   d. With stirring to suspend the solids, 750 g of catalyst precursor microspheres were slowly added to the beaker. The pH was maintained at between 2.8 and 3.5 by the continued addition of HNO₃ solution.
   e. After all the catalyst had been added, the pH was adjusted to 3.2 to 3.5, and the slurry heated to 180° F. for 30 minutes.
   f. After 30 minutes of exchange time, the slurry was filtered over Whatman 54 paper and washed with DI water.
   g. a–f above were repeated a second time, except for the following:
      1. the wet filtered cake was used as is,
      2. only 188 g of 54% ammonium nitrate solution was used.
      3. the total weight of water (including water entrained in the wet cake) was 1312 g.
   h. The wet cake was then dried overnight at room temperature.
6. The catalyst was calcined to reduced the unit cell size of the zeolite, as follows:
   a. 500 g of catalyst containing ca. 25% free moisture was placed into a fused silica tray as described above.
   b. The tray was covered and placed into a muffle furnace at 700° F. for 2 hours.
   c. The catalyst was removed from the furnace and cooled to room temperature.
   d. DI water (130 g) was stirred into the catalyst to restore 25% free moisture.
   e. The tray was again covered and inserted into a muffle furnace at 1150° F. for 2 hours to complete the calcination.
7. The catalyst was then ion exchanged until its sodium content was between about 0.38% and 0.48%. The initial exchange was done as in a through c below. Subsequent exchanges were done repeatedly as in d through g below until the sodium analysis was in the appropriate range (typically 1–3 additional exchanges):
   a. A solution of 1 g 54% ammonium nitrate solution per g of calcined catalyst and 2 g water per g of calcined catalyst was prepared and heated to 180° F.
   b. To this was added, with slow stirring to suspend the solids, the calcined catalyst.
   c. After 15 minutes, the slurry was filtered over Whatman 54 paper and washed with DI water.
   d. A solution of 1 g 54% ammonium nitrate solution per g of calcined catalyst and 2 g water per g of calcined catalyst was prepared and heated to 180° F.
   e. The pH of the solution was adjusted to 3.5 using HNO₃ solution.
   f. To this was added, with slow stirring to suspend the solids, the microspheres.
   g. The pH was readjusted to 3.2 to 3.5 using HNO₃ solution.
   h. After 15 minutes, the slurry was filtered over Whatman 54 paper and washed with DI water.

Samples of this catalyst were steam deactivated at either 1450° or 1500° F. for 4 hours using the Engelhard open system steaming procedure. All were screened $-100+270$ mesh after steaming. The 1500° F. steamed samples were tested using the MAT both as-steamed, and blended 1/1 with steamed, calcined clay microspheres (CCM) that had been screened $-100+270$ mesh. Samples steamed at 1450° F. were only tested blended.

EXAMPLE 3

Another batch of experimental catalyst of the invention was prepared by the procedure described below. This procedure is equivalent to that used for Example 1, but on a larger scale to generate more material for testing.

1. To a 3 liter Pyrex resin kettle prepared for stirred, reflux operation was added the following ingredients, in the order listed with sufficient stirring to suspend the solids:
   a. 1367 g of N-Brand sodium silicate solution (9.10% Na₂O, 29.3% SiO₂).
   b. a solution of 553 g of 25.0% NaOH solution and 366 g of DI water.
   c. 228 g of seed mixture.
   d. 360 g of PMS-1 and 307 g of PMS-2. (See Example 1)
2. The reaction mixture was heated to 210° F. for crystallization.
3. After zeolite growth had reached a peak of about 60% by X-ray diffraction vs. a nominally 100% Y-faujasite reference, the solids were filtered over Whatman 54 filter paper, washed with DI water, and dried on the bench overnight.
4. The dried, crystallized microspheres were ammonium ion exchanged as follows to reduce the Na₂O content of the microsphere to about 3%:
   a. 1691 g of a solution containing 54% by weight ammonium nitrate was added to a 4 liter stainless steel beaker.
   b. To this, 564 g of DI water was added.
   c. The pH was adjusted to 3.5 using a 1/1 solution of HNO₃ in water.
   d. With stirring to suspend the solids, 1127 g of catalyst precursor microspheres were slowly added to the beaker. The pH was maintained at between 2.8 and 3.5 by the continued addition of HNO₃ solution.
   e. After all the catalyst had been added, the pH was adjusted to 3.2 to 3.5, and the slurry heated to 180° F. for 15 minutes.
   f. After 15 minutes of exchange time, the slurry filtered over Whatman 54 paper and washed with DI water.
   g. a–f above were repeated a second time, except for the following:
      1. the wet filtered cake was used as is,
      2. only 560 g of 54% ammonium nitrate solution was used.
      3. 1500 g DI water.
   h. The wet cake was then dried overnight on the bench.
6. The catalyst was calcined to reduced the unit cell size of the zeolite, as follows:

a. About 500 g of catalyst containing ca. 25% free moisture was placed into each of two fused silica trays described above.
b. The trays were covered and placed into muffle furnaces at 700° F. for 2 hours.
c. After cooling to room temperature, DI water was stirred into each catalyst to restore 25% free moisture.
d. The trays were again covered and inserted into muffle furnaces at 1150° F. for 2 hours to complete the calcination.

7. The catalyst was then ion exchanged until its sodium content was between about 0.38% and 0.48%. The initial exchange was done as in a through c below. Subsequent exchanges were done repeatedly as in d through g below until the sodium analysis was in the appropriate range (typically 1–3 additional exchanges):
a. A solution of 1 g 54% ammonium nitrate solution per g of calcined catalyst and 2 g water per g of calcined catalyst was prepared and heated to 180° F.
b. To this was added, with slow stirring to suspend the solids, the calcined catalyst.
c. After 15 minutes, the slurry was filtered over Whatman 54 paper and washed with DI water.
d. A solution of 1 g 54% ammonium nitrate solution per g of calcined catalyst and 2 g water per g of calcined catalyst was prepared and heated to 180° F.
e. The pH of the solution was adjusted to 3.5 using $HNO_3$ solution.
f. To this was added, with slow stirring to suspend the solids, the microspheres.
g. The pH was readjusted to 3.2 to 3.5 using $HNO_3$ solution.
h. After 15 minutes, the slurry was filtered over Whatman 54 paper and washed with DI water.

The catalyst of the invention (Example 3) and a reference high zeolite content commercial in situ octane FCC catalyst were screened −100+325 mesh and tested for metals tolerance. Portions of each were impregnated with nominally 2000 ppm Ni and 4000 ppm V (from a cyclohexane solution of the metal naphthenates) and calcined to burn off the carbon. The actual values were 1708 ppm Ni/3732 ppm V for the catalyst of Ex 3, and 1632 ppm Ni/3972V for the commercial catalyst. Portions of both clean and metals contaminated samples of each catalyst were steam deactivated for 4 hours at 1450° F. in an atmosphere of 90% steam/10% air using the Engelhard closed steaming system procedure mentioned in the '902 patent. Steamed catalyst was blended 1/1 with steamed, screened (−100+270) CCM microspheres and tested using the MAT procedure substantially as described in the '902 patent.

EXAMPLE 4

The physical, chemical, and MAT catalytic properties of the catalysts of examples 1, 2, 3, and the commerical catalyst were measured and the results are reported in Tables I and II. From this data it was concluded that the control catalysts and the catalysts of this invention from Examples 1 and 3 respectively would perform identically in catalytic cracking.

TABLE I

Physical and chemical properties of Catalysts of the Invention and the '902 patent.

| Sodium Form Properties: | Ex 1 (Catalysts of the Invention) | Ex 2 (Catalyst of the '902 patent) |
|---|---|---|
| Y index (%) | 60 | 61 |
| BET surface area (m²/g) | 661 | 643 |
| Matrix surface area (m²/g) | 78 | 88 |
| Zeolite surface area (m²/g) | 583 | 555 |
| Hg porosity (600-20K A. dia, cc/g) | .02 | .02 |
| N₂ porosity: | | |
| cc/g 25-100 A. dia | .08 | .09 |
| cc/g 100-600 A. dia. | .01 | .01 |
| Final Catalyst Property: | | |
| % Na₂O | .47 | .43 |

TABLE II

MAT Conversion (wt. %) of Catalysts of the Invention and Controls

| % Steam | Stmg. Temp. | Unblend or Blended | With or w/o metals | Catalyst Ex 1 | Ex 2 | Ex 3 | Commercial Catalyst |
|---|---|---|---|---|---|---|---|
| 100 | 1450 | Bl | w/o | 68 | 67 | | |
| 100 | 1500 | Bl | w/o | 60 | 60 | | |
| 100 | 1500 | Un | w/o | 74 | 74 | | |
| 90 | 1450 | Bl | w/o | | | 72 | 69 |
| 90 | 1450 | Bl | w | | | 56 | 53 |

The data in Table II show that the MAT activity and stability of the catalysts of this invention (Examples 1 & 3) were at least as good as a laboratory control (Example 2) and commercial octane catalyst both with and without metals. Data (not shown) indicated that the selectivities of the four catalysts are equivalent in the uncontaminated state and that the contaminated selectivities are also equivalent for Example 3 and the commercial octane catalyst.

EXAMPLE 5

Tests were carried out to identify formulation and crystallization conditions that yielded ca. 60% Y when preparing catalysts from physical mixtures of microspheres of metakaolin and microspheres of kaolin calcined through the exotherm. Three factors were examined: particle size of clay, sodium disilicate binder level, and crystallization mix composition.

TABLE III

Effect of coarse clay and SDS binder level on zeolite content.

| Clay Types | Clay Ratio | Binder Level (% SiO₂ from SDS) | Max. % Zeolite |
|---|---|---|---|
| ASP400[1]/ASP600[2] | 80/20 | 8 | 45 |
| ASP400/ASP600 | 80/20 | 2 | 55 |
| ASP400 | 100% | 2 | 62 |
| MSS Control | | 5 | 61 |

[1]Average particle size - about 5 micron; about 30% finer than 2 microns.
[2]Average particle size - about 0.55 micron; about 80% finer than 2 microns.

Table III gives typical maximum zeolite levels as a function of MS composition (where PMS-1 and PMS-2 are calcined at 1830° and 1350° F. respectively). Data in Table III indicated that to increase microsphere porosity to the level needed for 60% Y required that the clay particle size be coarsened from an 80/20 blend of (ASP400) ASP600 to 100% ASP400. In addition, for PMS-1 in particular, the SDS binder level had to be reduced from 4–5% $SiO_2$ used for MSS to 2%. This significantly reduced the sintering experienced during high temperature (ca. 1000° C.) calcination.

Table IV gives the attrition resistance characteristics of the two PMMS samples (Examples 1 and 3) plus two attrition resistant current commercial catalysts for comparison. It shows that the catalysts of this invention are highly attrition resistant.

TABLE IV

Attrition Resistance of PMMS Catalysts

| Catalyst Type | Engelhard Attrition Index, EAI (%/sec) | Roller Airjet Loss (%) |
|---|---|---|
| PMMS Sample 1 | 0.28 | 1.66 |
| PMMS Sample 2 | — | 1.50 |
| PMMS Sample 2 (−100 + 325 mesh) | — | 1.67 |
| Commercial catalyst A | typically 0.4 | 3.37 |
| Commercial catalyst B | typically 0.4 | 2.51 |

I claim:

1. The method for making a high zeolite content fluid catalytic cracking catalyst comprising the steps of:
   (a) forming an aqueous slurry comprising of a coarse particle size fraction of uncalcined kaolin clay having an average particle size in the range of about 2 to 6 microns;
   (b) spray drying the aqueous slurry to obtain porous coherent microspheres;
   (c) calcining one portion of the microspheres obtained in step (b) at a temperature and for a time sufficient to convert the hydrated kaolin clay in the microspheres substantially to metakaolin, but insufficient to undergo the characteristic kaolin exotherm;
   (d) calcining another portion of the microspheres from step (a) or another batch of microspheres obtained by step (a) at a temperature and for a time sufficient to cause the kaolin to undergo the exothermic kaolin reaction;
   (e) mixing the microspheres obtained in steps (c) and (d) in weight proportions of about 20 to 80 parts by weight (c) to 80 to 20 parts by weight (d) with sodium silicate and water to obtain an alkaline slurry of microspheres of calcined clay in an aqueous solution containing sodium silicate;
   (f) heating the slurry of microspheres of calcined clay to a temperature and for a time sufficient to crystallize at least about 40% by weight Y-faujasite in the microspheres, said Y-faujasite being in the sodium form;
   (g) separating the microspheres containing at least about 40% by weight Y-faujasite from at least a major portion of its mother liquor; and
   (h) replacing sodium cations in the microspheres separated in step (g) with ammonium or rare earth cations or both.

2. The method of claim 1 wherein the coarse clay used to make the microspheres in step (d) has an average particle size in the range of 4 to 6 microns.

3. The method of claim 1 wherein the slurry in step (a) also contains a binder effective amount of sodium silicate used in amount in the range 1 to 10% by weight silica relative to the weight of the clay.

4. The method of claim 1 wherein the microspheres composed of clay that has been calcined at least substantially through its characteristic exotherm contains substantially no mullite.

5. The method of claim 1 wherein the different coarse clay is used to make microspheres in steps (c) and (d) and the coarse clay in step (a) used to make calcined microspheres in step (d) has a larger average particle size than the coarse clay used to make calcined microspheres in step (c).

6. The method of claim 1 wherein the microspheres of kaolin calcined through the exotherm are present in amount in the range of about 50 parts in 100 to 65 parts in 100 by weight in step (e).

7. The method claim 1 wherein the clay in step (a) contains no more than about 33% by weight of particles finer than 2 microns.

8. The method of claim 1 wherein the solids content of the slurry in step (a) is in the range of 40 to 50.

9. The method of claims 1 thereon the sodium silicate mixed with the microspheres in step (d) is in amount such that microspheres having a $SiO_2/Al_2O_3$ molar ratio of about 2.0 to 2.2 are obtained in step (e).

10. The method of claim 1 wherein sodium aluminosilicate seeds are included in the slurry formed in step (e).

11. The method of claim 1 wherein the molar ratio of $Na_2O/SiO_2$ in the solution phase at the beginning of the crystallization process of step (e) is about 0.45 to 0.80 and the weight ratio of $SiO_2$ in the solution phase to the clay microspheres at the beginning of the crystallization process of step (e) is about 0.35 to 2.5.

12. The method of claim 1 wherein more than 50% by weight Y-faujasite is crystallized in the microspheres in step (f).

13. The method of claim 1 wherein at least 55% by weight Y-faujasite is crystallized in the microspheres in step (e).

14. The method of claim 1 including the steps of:
   (g) replacing sodium cations in the microspheres separated in step (f) with ammonium ions;
   (h) calcining the microspheres from step (g) in the presence of steam to reduce the unit cell size;
   (i) further exchanging the microspheres with ammonium ions to reduce $Na_2O$ content to below 1%; and
   (j) further calcining the microspheres to further reduce the unit cell size of the zeolite.

15. The method of making a fluid cracking catalyst comprising the steps of:
   (a) providing coherent porous microspheres of calcined kaolin clay wherein the calcined clay consists essentially of metakaolin, said microspheres having a Hg pore volume between about 0.2 to 0.5 cc/g;
   (b) providing coherent porous microspheres of calcined kaolin wherein the calcined clay consists essentially of kaolin clay that has been calcined at least substantially through its characteristic exotherm, said microspheres having a Hg pore volume between 0.3 to 0.5 cc/g;
   (c) mixing the microspheres of steps (a) and (b) in a weight ratio in the range of 20/80 to 80/20 with water soluble sodium silicate, sodium hydroxide and water to obtain an alkaline slurry;
   (d) adding zeolite initiator to the slurry of claim (c) microspheres before step (e) below;
   (e) heating the slurry of physical mixture of microspheres of calcined clay from step (c) to a temperature and for a time sufficient to crystallize more than 40% by weight Y-faujasite in the microspheres, said Y-faujasite being in the sodium form;
   (f) separating the microspheres containing at least about 40% by weight Y-faujasite from at least a major portion of its mother liquor; and (g) replacing sodium cations in the microspheres separated in step (f) with ammonium or rare earth cations or both.

16. The method of claim 14 wherein more than 50% by weight Y-faujasite is crystallized in the microspheres in step (e) and the ratio of water to microspheres at the beginning of step (b) is in the range of 2 to 12.

17. The fluid catalytic cracking catalyst made by the method of claim 1.

18. The fluid catalytic cracking catalyst made by the method of claim 15.

19. The cracking catalyst of claim 17 or 18 which is present in admixture with substantially catalytically inert microspheres of calcined kaolin clay free from zeolite.

20. The cracking catalyst of claim 19 wherein said microspheres of calcined clay have a surface area below 10 m²/g.

21. The cracking catalyst of claims 17 or 18 which is blended with about an equal weight of microspheres of substantially catalytically inert microspheres of calcined kaolin clay or microspheres obtained by calcining a mixture of kaolin clay and a source of magnesium oxide.

* * * * *